(12) United States Patent
Shinohara (10) Patent No.: US 8,471,942 B2
(45) Date of Patent: Jun. 25, 2013

(54) SOLID-STATE IMAGE PICKUP DEVICE

(75) Inventor: Mahito Shinohara, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/274,853

(22) Filed: Oct. 17, 2011

(65) Prior Publication Data

US 2012/0092540 A1    Apr. 19, 2012

Related U.S. Application Data

(63) Continuation of application No. 12/392,330, filed on Feb. 25, 2009, now Pat. No. 8,063,966.

(30) Foreign Application Priority Data

Mar. 14, 2008    (JP) .................................. 2008-066053

(51) Int. Cl.
*H04N 5/335* (2011.01)
*H04N 3/14* (2006.01)

(52) U.S. Cl.
USPC .......................................... 348/308; 348/294

(58) Field of Classification Search
USPC .................... 257/290, 291, 292; 348/294, 308
See application file for complete search history.

(56) References Cited

U.S. PATENT DOCUMENTS

| | | | |
|---|---|---|---|
| 4,962,412 A | 10/1990 | Shinohara et al. | |
| 5,008,206 A | 4/1991 | Shinohara et al. | |
| 5,060,042 A | 10/1991 | Shinohara et al. | |
| 5,086,326 A | 2/1992 | Shinohara et al. | |
| 5,146,339 A | 9/1992 | Shinohara et al. | |
| 5,280,358 A | 1/1994 | Yushiya et al. | |
| 6,828,601 B2 | 12/2004 | Shinohara | |
| 6,876,019 B2 | 4/2005 | Shinohara | |
| 7,133,074 B1 | 11/2006 | Brehmer et al. | |
| 7,250,970 B2 | 7/2007 | Shinohara | |
| 7,394,492 B2 | 7/2008 | Shinohara | |
| 8,063,966 B2 * | 11/2011 | Shinohara | 348/308 |
| 2005/0253945 A1 | 11/2005 | Shinohara | |
| 2007/0023788 A1 | 2/2007 | Yasui et al. | |
| 2008/0252764 A1 | 10/2008 | Shinohara | |

(Continued)

FOREIGN PATENT DOCUMENTS

| | | |
|---|---|---|
| JP | 07-023298 A | 1/1995 |
| JP | 2003-051989 A | 2/2003 |
| JP | 2006-081241 A | 3/2006 |
| JP | 2007-036916 A | 2/2007 |
| JP | 2008-060949 A | 3/2008 |

OTHER PUBLICATIONS

English Translation: JPO Reasons for Refusal for JP200866053A (Jul. 17, 2012).*

(Continued)

*Primary Examiner* — David N Spector
(74) *Attorney, Agent, or Firm* — Fitzpatrick, Cella, Harper & Scinto (57) ABSTRACT

A solid-state image pickup device includes a voltage supply circuit configured to supply a voltage to load MOS transistors provided to vertical output lines and columnar signal-processing circuits. The voltage supply circuit includes a first amplifier circuit configured to amplify a predetermined voltage supplied to an input part thereof from a voltage generator and to output an amplified voltage to a voltage supply wire, and a sample-and-hold circuit including a sampling switch provided on a path between the voltage generator and the input part and a hold capacitor configured to hold the voltage sampled by the sampling switch.

6 Claims, 7 Drawing Sheets

U.S. PATENT DOCUMENTS

2009/0200449 A1  8/2009  Iwata et al.
2010/0002117 A1  1/2010  Iwane et al.

OTHER PUBLICATIONS

English Translation: Written Response to Reasons for Refusal for JP200866053A (Sep. 13, 2012).*

English Translation: Amendment Submitted with Written Response to Reasons for Refusal for JP200866053A (Sep. 13, 2012).*

Japanese Office Action (Notification of Reasons for Refusal) dated Jul. 17, 2012, in related corresponding Japanese Patent Application No. 2008-066053.

* cited by examiner

SOLID-STATE IMAGE PICKUP DEVICE

FIELD OF THE INVENTION

The present invention relates to solid-state image pickup devices, and more specifically to a technique of reducing noise occurring when reading is performed by a columnar signal-processing circuit provided for each pixel column of a solid-state image pickup device.

BACKGROUND OF THE INVENTION

Description of the Related Art

Known amplifier solid-state image pickup devices include amplifier transistors provided in pixels thereof. Each amplifier transistor receives at a control electrode thereof a charge generated by a photoelectric converter, amplifies the charge, and outputs the amplified charge as a signal to a vertical output line, which is provided for each pixel column.

In some cases, vertical output lines are provided with columnar signal-processing circuits that process signals. Japanese Patent Laid-Open No. 2003-051989 discloses an exemplary configuration in which each columnar signal-processing circuit includes an amplifier circuit and a correlated-double-sampling (CDS) circuit. In this configuration, noise is reduced by inputting, to a differential amplifier, noise signals sequentially output from the columnar signal-processing circuits and signal components on which the noise signals are superimposed.

In CDS processing, a noise signal and a signal in which the noise signal is superimposed on an optical signal are sequentially sampled, and the difference between the two signals is calculated, whereby a signal in which the noise component is reduced is output. The circuit type varies with the finite difference method used, and the configuration disclosed in Japanese Patent Laid-Open No. 2003-051989 is only exemplary.

In the foregoing case where the pixels include amplifier transistors, the columnar signal-processing circuits are often configured to operate as followers. To make the columnar signal-processing circuits to operate as followers, a constant current needs to be supplied to the amplifier transistors. In this respect, Japanese Patent Laid-Open No. 2007-036916 discloses another exemplary configuration in which a constant current is supplied by providing each vertical output line with a metal-oxide-semiconductor (MOS) transistor configured to supply a constant current, i.e., a load MOS transistor.

The gates of the load MOS transistors provided for the respective vertical output lines are connected to a common wire. A constant voltage is supplied from a voltage supply circuit to the gates so that a desired constant current can be supplied thereto.

Figure 6:
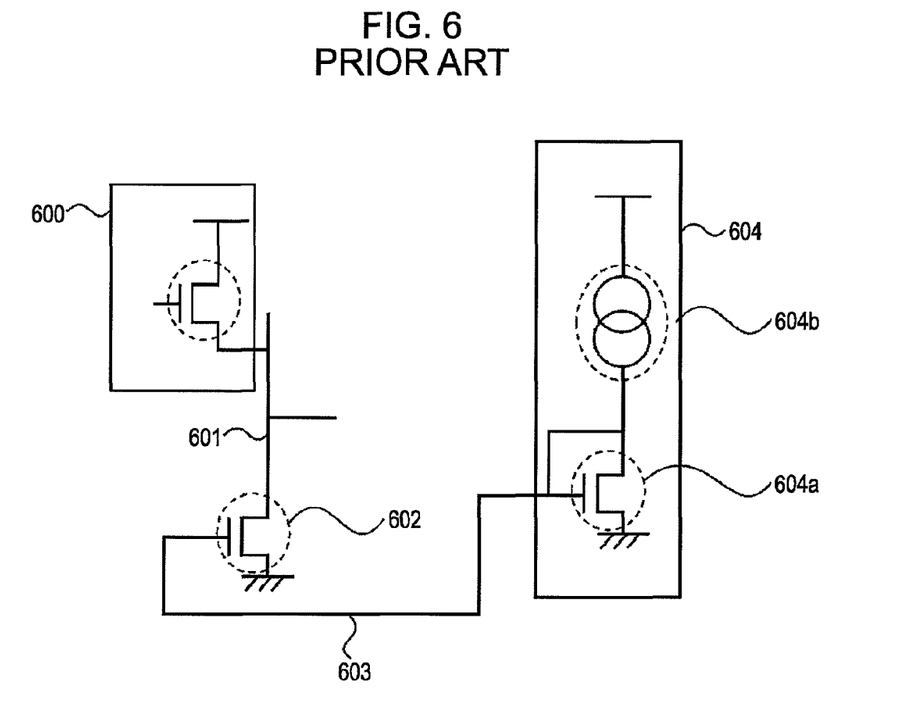
FIG. 6 is a diagram for describing a related-art voltage supply circuit.

Referring to FIG. 6, the configuration disclosed in Japanese Patent Laid-Open No. 2007-036916 including the voltage supply circuit and the load MOS transistors provided for the vertical output lines will be described.

A unit pixel 600 includes an amplifier transistor. A constant current is supplied from a load MOS transistor 602 via a vertical output line 601 to the amplifier transistor of the pixel 600. A voltage is supplied to the gate of the load MOS transistor 602 via a voltage supply wire 603. The gate and the drain of a MOS transistor 604a are connected to the voltage supply wire 603. A constant current source 604b supplies a constant current to the MOS transistor 604a. The MOS transistor 604a and the constant current source 604b constitute a voltage supply circuit 604. The load MOS transistor 602, the MOS transistor 604a, and the constant current source 604b constitute a current mirror circuit.

In this configuration, image quality may be deteriorated because of noise generated by a mechanism described below.

Figure 7:
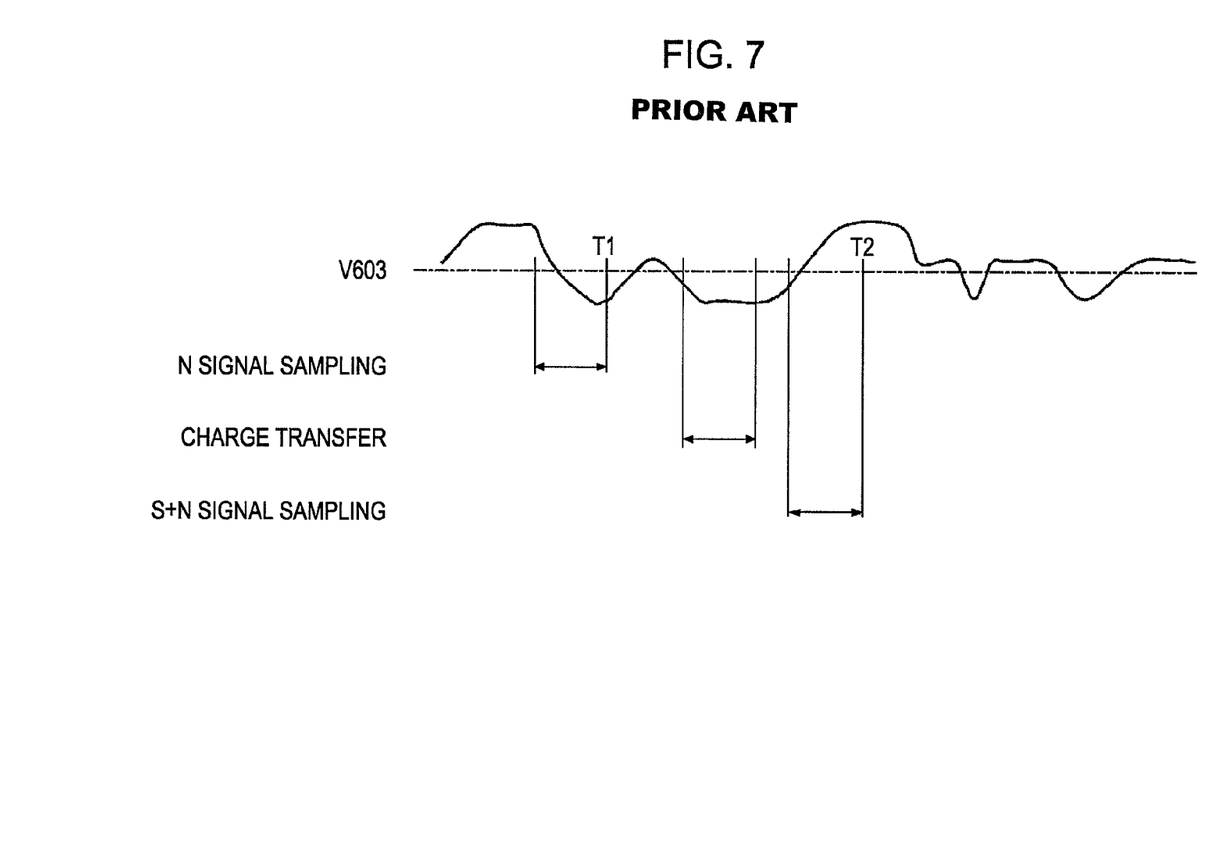
FIG. 7 is a diagram for describing a problem in the related-art voltage supply circuit.

Noise generation in the configuration shown in FIG. 6 will be described with reference to FIG. 7, which is a conceptual diagram showing operation timings in CDS processing. The horizontal axis represents time. The curve V603 represents the potential of the voltage supply wire 603. If the symbol "N" is used to denote a noise signal, and if the symbol "S" is used to denote a signal generated by photoelectric conversion, then FIG. 7 shows the respective timings at which the N signal and the S+N signal are sampled by a CDS circuit. For example, in the case of Japanese Patent Laid-Open No. 2003-051989, hold capacitors 23 and 24 shown in FIG. 1 thereof hold signals at such timings.

Referring to FIG. 7, an examination by the present inventors has revealed that the potential of the voltage supply wire 603 shows temporal changes. This is because of noise generated by a voltage generator of the voltage supply circuit 604.

The voltage supply circuit 604 includes the transistor 604a. It is generally known that, when a transistor circuit operates, the transistor circuit generates so-called 1/f noise, whose power spectrum is proportional to the reciprocal of a frequency f, and so-called thermal noise, whose power spectrum is constant with respect to the frequency and is proportional to the output resistance. These kinds of noise cause the temporal changes in the potential of the voltage supply wire 603.

In the operation of a solid-state image pickup device, the time lag between N signal sampling and S+N signal sampling is usually about several microseconds. The frequency band of the noise described above is a band of about several thousand kilohertz. Let us suppose that the thermal noise component in the band of several thousand kilohertz ranges from a few tens of microvolts to several hundred microvolts. Even if the potential of the voltage supply wire is designed to be 800 mV, for example, the temporal change caused by the noise in the frequency band of several thousand kilohertz ranges from a few tens of microvolts to several hundred microvolts, with the average potential of 800 mV at the center of the range.

Accordingly, as shown in FIG. 7, the potential of the voltage supply wire 603 at time T1 when the N signal is sampled differs from the potential of the voltage supply wire 603 at time T2 when the S+N signal is sampled, by a level equivalent to the aforementioned range. Moreover, the potential randomly changes at every sampling. As the potential of the voltage supply wire 603 increases, the current of the load MOS transistor 602 also increases, and accordingly the output of a source-follower circuit constituted by the amplifier transistor, which is a MOS transistor, and the load MOS transistor 602 increases. Because the transistors in this case are assumed to be negative-channel MOS (NMOS) transistors, an increase in the output of the source-follower circuit means a decrease in the source potential. The relationship between the change in the amperage flowing through the load MOS transistor 602 and the gate potential is also described on the assumption that the transistors are NMOS transistors.

It is desirable that the difference between the potential of the vertical output line at the time of N signal sampling and the potential of the vertical output line at the time of S+N signal sampling becomes equal to the signal amount excluding the noise component. However, for the reason described above, a randomly changing voltage is sometimes superimposed on a signal that has undergone CDS processing. Such noise is generated separately from pixel noise attributed to the pixel, and is hereinafter called "horizontal noise."

It is known that, in an amplifier solid-state image pickup device including two-dimensionally arranged pixels, signals of the pixels are read in time series by a vertical scanning circuit for each group of pixels included in a single row of the pixel array at a time. Therefore, the above-described noise component randomly varies with pixel row. Accordingly, such a noise component, which varies from row to row, appears in a display image as a change in the image level for each horizontal row.

A restricting factor that makes it difficult to reduce the noise of the voltage generator included in the voltage supply circuit 604 shown in FIG. 6 will be described.

It is desirable to set the conductance of the load MOS transistor 602 to a small value. This is because the variation in the constant current can be made smaller than the variation among the threshold voltages of the respective load MOS transistors 602. Specifically, when the gate length and the gate width of the load MOS transistor 602 are denoted by L and W, respectively, it is only necessary to make W/L small by setting a large value for L. In this case, if the MOS transistor 604a is made to be of the same size as the load MOS transistor 602, the output resistance of the voltage supply circuit 604 becomes large. This increases the noise in the several thousand kilohertz band. To reduce the output resistance of the voltage supply circuit 604, the number of MOS transistors 604a that are connected in parallel can be increased. Such a configuration, however, requires an increase in the amperage of the current of the constant current source 604b in correspondence with the number of transistors 604a to be connected in parallel. Considering the current consumption, the number of transistors 604a to be connected in parallel cannot be increased easily.

The above description concerns a mechanism of generation of horizontal noise due to changes in the gate potential of a load MOS transistor configured to supply a current to an amplifier transistor included in a pixel. More generally speaking, the mechanism can be applied to a case where a common voltage is supplied to columnar circuits each provided for a single column or a group of columns, such as signal-processing circuits connected to respective pixel columns. This means that, if a change in the potential of the voltage supply wire changes the level of a signal that is processed by the signal-processing circuit, there is a possibility that a mechanism similar to the one described above causes horizontal noise. For example, in a case of an amplifier circuit, functioning as a signal-processing circuit, configured to amplify a pixel signal, a change in the potential of the voltage supply wire via which a reference voltage is supplied to the amplifier circuit may also cause horizontal noise.

To summarize, a known amplifier solid-state image pickup device in which CDS processing is performed has a problem in that the noise of a voltage supply circuit configured to supply a voltage to a reading circuit may cause horizontal noise. Particularly, it is difficult to reduce the noises of the voltage supply circuit and a voltage supply wire connected to the gates of load MOS transistors provided to vertical output lines.

SUMMARY OF THE INVENTION

In light of the above, the present invention provides a solid-state image pickup device in which horizontal noise is reduced.

According to an aspect of the present invention, a solid-state image pickup device includes a pixel array in which photoelectric converters configured to convert light into charge and amplifiers configured to amplify and output signals generated in accordance with the charge generated by the photoelectric converters are arranged two-dimensionally, a plurality of vertical output lines to which the signals from the amplifiers are output, a plurality of load MOS transistors connected to the vertical output lines and configured to supply a constant current to the amplifiers, and a vertical scanning circuit configured to read out the signals to the vertical output lines for each pixel row of the pixel array. The solid-state image pickup device outputs signals used in correlated double sampling to the vertical output lines. The device also includes a voltage supply wire via which a voltage is supplied to gates of the load MOS transistors, and a voltage supply circuit configured to supply the voltage to the voltage supply wire. The voltage supply circuit includes a first amplifier circuit configured to amplify a predetermined voltage supplied to an input part thereof from a voltage generator and to output an amplified voltage to the voltage supply wire, and a sample-and-hold circuit including a sampling switch provided on a path between the voltage generator and the input part and a hold capacitor configured to hold the voltage sampled by the sampling switch.

Other features and advantages of the present invention will be apparent from the following description taken in conjunction with the accompanying drawings, in which like reference characters designate the same or similar parts throughout the figures thereof.

The accompanying drawings, which are incorporated in and constitute a part of the specification, illustrate embodiments of the invention, and, together with the description, serve to explain the principles of aspects of the present invention.

DESCRIPTION OF THE EMBODIMENTS

First Embodiment

Figure 1:
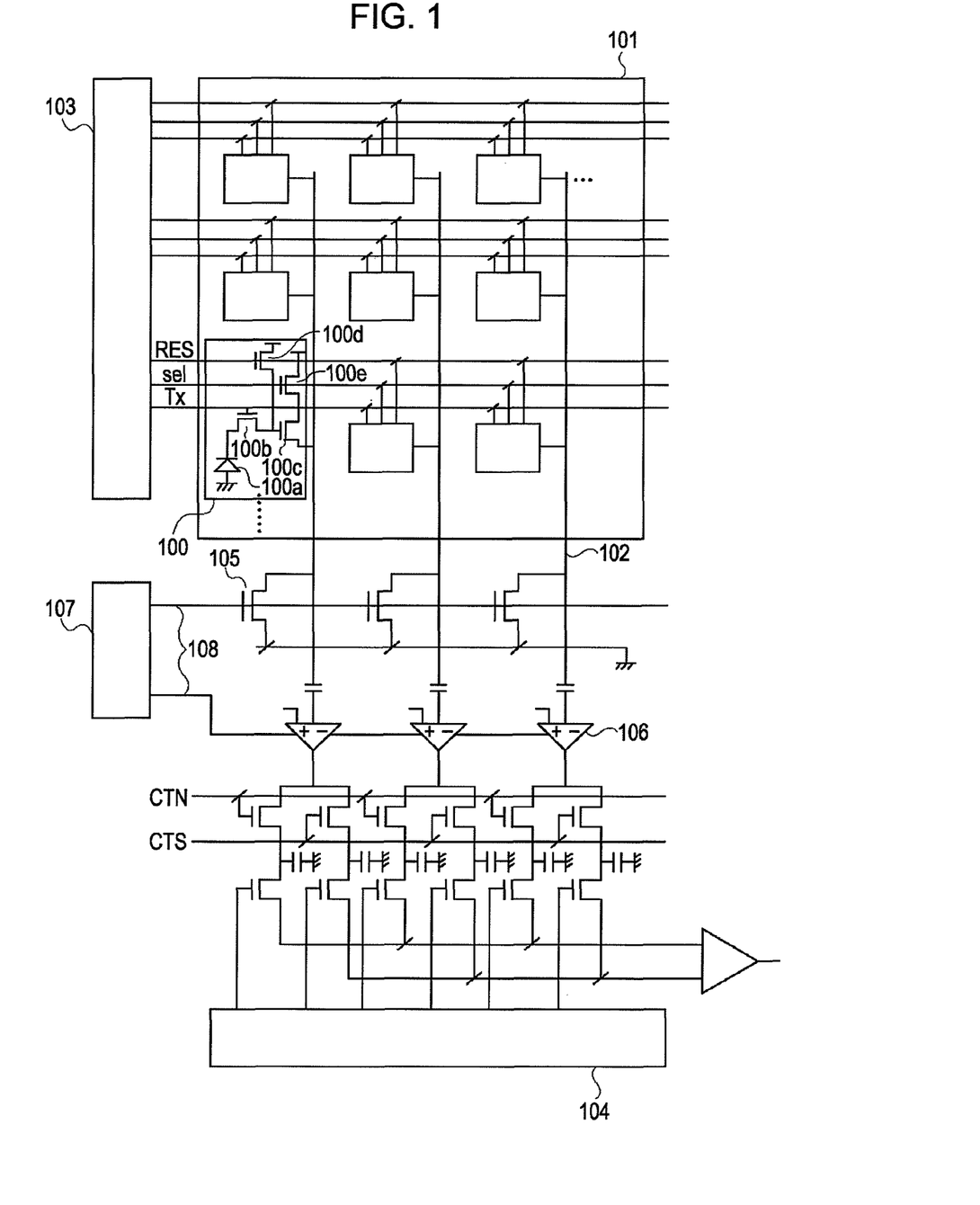
FIG. 1 shows the overall configuration of a solid-state image pickup device according to an embodiment of the present invention.

FIG. 1 is a conceptual diagram of a solid-state image pickup device according to a first embodiment.

The solid-state image pickup device includes pixels 100. The pixels 100 each include a photoelectric converter 100a, which is a photodiode in the first embodiment.

A transfer portion 100b transfers a charge of the photoelectric converter 100a to an input part of a pixel amplifier 100c. The pixel amplifier 100c amplifies and outputs a signal generated in accordance with the charge produced at the photoelectric converter 100a. A reset portion 100d resets the potential of the input part of the pixel amplifier 100c. A select portion 100e controls which signal is to be output to a corresponding one of vertical output lines 102. The foregoing elements can be configured as MOS transistors. The transistor serving as the pixel amplifier 100c is configured as a source follower circuit in combination with a load MOS transistor 105, which will be described separately below.

A switch that samples a noise signal is driven via a control wire CTN. A switch that samples an optical signal on which the noise signal is superimposed is driven via a drive wire CTS. The noise signal is sometimes a noise signal from the pixel and is sometimes an offset noise from an amplifier circuit included in a columnar signal-processing circuit.

A pixel array 101 is constituted by the pixels 100, which are arranged two-dimensionally. Signals from the pixels 100 are output to the vertical output lines 102. The pixels 100 included in each column are connected to one of the vertical output lines 102. This unit of the pixels 100 is referred to as a pixel column.

A vertical scanning circuit 103 reads signals from each row of the pixel array 101, outputs the signals to the vertical output lines 102, and subsequently drives the pixel array 101 in such a manner that the signals are input in parallel to signal-processing circuits described separately below. Each group of the pixels 100 selected by the vertical scanning circuit 103 at a time for outputting signals therefrom to the vertical output lines 102 is referred to as a pixel row. The vertical scanning circuit 103 can be configured as a shift register, for example.

A horizontal scanning circuit 104 sequentially selects the signals that have been processed by the signal-processing circuits and outputs the signals to an external device. The horizontal scanning circuit 104 can be configured as a shift register, for example. The load MOS transistor 105, which is provided for each of the vertical output lines 102, supplies a constant current to corresponding ones of the pixel amplifiers 100c. The load MOS transistors 105 and the pixel amplifiers 100c constitute source follower circuits. The load MOS transistors 105 are provided for the respective vertical output lines 102. The gates of the load MOS transistors 105 are connected to a common line. A voltage is supplied to the gates from a voltage supply circuit 107, which will be described separately below, via a voltage supply wire 108.

An amplifier circuit 106 is provided for each column or for each group of columns, and therefore is referred to as a columnar signal-processing circuit. Such a columnar signal-processing circuit sometimes includes a CDS circuit that reduces the level of noise signals of the pixels. For example, the CDS circuit may be configured to reduce noise of the pixels by performing clamping through a capacitor provided for an input terminal of an amplifier circuit such as the amplifier circuit 106. The CDS circuit may be provided to either the columnar signal-processing circuit, as described above, or a device provided outside the solid-state image pickup device. In the configuration shown in FIG. 1, the columnar signal-processing circuits output to the vertical output lines 102 signals used for CDS processing, specifically, the noise signals of the pixels 100 and signals in which the noise signals are superimposed on optical signals.

It is well known that an amplifier circuit has an operational characteristic in which a constant voltage or a constant current is required. A voltage required for supplying the constant voltage or current is supplied to the amplifier circuit from a voltage supply circuit, described separately below, via a voltage supply wire. Specifically, in a case where the amplifier circuit is a differential operational amplifier circuit, such a voltage may be a voltage that is to be supplied to the gate of a MOS transistor included in a constant current source that specifies a bias current (tail current).

As aforementioned, the voltage supply circuit 107 supplies a voltage to the load MOS transistors 105 or the amplifier circuits 106, for example. The solid-state image pickup device may include a single voltage supply circuit 107, or may include a plurality of voltage supply circuits 107 if columnar signal-processing circuits or the like are disposed on both sides of the pixel array 101. The voltage from the voltage supply circuit 107 is supplied via voltage supply wires 108.

Figure 2:
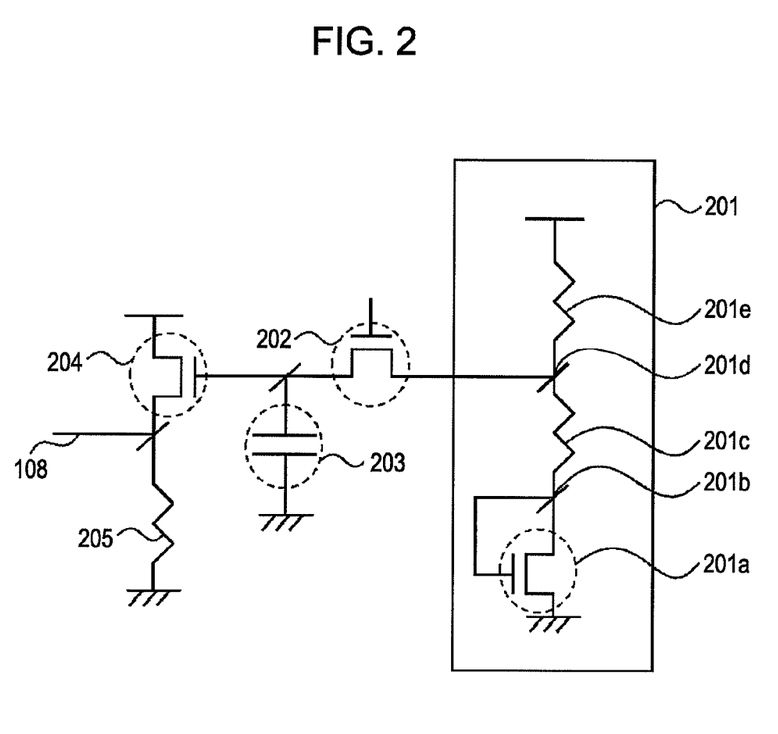
FIG. 2 shows a voltage supply circuit according to a first embodiment.

FIG. 2 shows details of the voltage supply circuit 107 shown in FIG. 1 and a voltage generator 201.

Referring to FIG. 2, the voltage generator 201 includes a transistor 201a whose gate and drain are short-circuited, resistors 201c and 201e, a connection node 201d between the resistors 201c and 201e, whose resistances determine the potential of the connection node 201d, and a connection node 201b between the drain of the transistor 201a and an end of the resistor 201c. The voltage generator 201 outputs a predetermined voltage that determines the constant current supplied to the pixel amplifiers 100c. This voltage is appropriately determined in accordance with, for example, the sizes of the load MOS transistors 105 and the pixel amplifiers 100c. Specifically, the voltage is determined by the resistances of the resistors 201c and 201e and a source voltage supplied to a node other than the connection node 201d between the resistors 201c and 201e. The voltage generator 201 may be provided either outside or inside the solid-state image pickup device.

A sampling switch 202 samples the potential of the connection node 201d. A hold capacitor 203 holds the potential sampled by the sampling switch 202. The hold capacitor 203 has one end thereof grounded and the other end thereof connected to the sampling switch 202 and the gate of a transistor 204, described below.

The transistor 204 is supplied through the gate thereof with the voltage held in the hold capacitor 203. A resistor 205 supplies a load current to the transistor 204. The transistor 204 and the resistor 205 constitute a source follower circuit (a first amplifier circuit), which serves as an output part of the voltage supply circuit 107. The gate of the transistor 204, which is a MOS transistor, serves as an input part of the source follower circuit. The sampling switch 202 is disposed on a path between the voltage generator 201 and the input part of the source follower circuit. The source follower circuit serving as the first amplifier circuit amplifies the predetermined voltage supplied from the voltage generator 201 to the input part (gate) thereof and outputs the amplified voltage to the voltage supply wire 108.

The voltage generator 201 is an equivalent of the voltage supply circuit 604 of the related-art example shown in FIG. 6. In FIG. 6, the node between the MOS transistor 604a and the constant current source 604b is directly connected to the voltage supply wire 603. In other words, a voltage generated by a voltage generator is directly supplied to a voltage supply wire. In contrast, in the first embodiment, the first amplifier circuit (the transistor 204 and the resistor 205) is provided between the voltage generator 201 and the voltage supply wire 108, and a sample-and-hold circuit (the sampling switch 202 and the hold capacitor 203) is provided between the gate of the transistor 204, serving as the input part of the first amplifier circuit, and the voltage generator 201.

Figure 3:
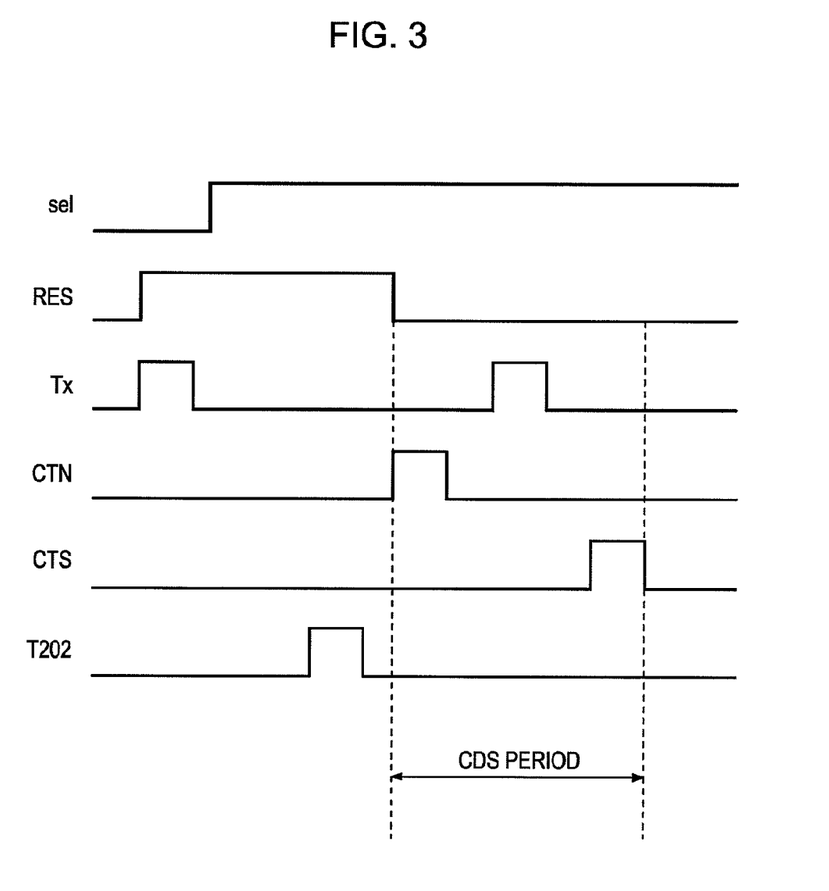
FIG. 3 shows operation pulses of the solid-state image pickup device shown in FIG. 1.

The timing of sample-and-hold performed by the sample-and-hold circuit will be described. FIG. 3 is a conceptual diagram of operation pulses in the solid-state image pickup device shown in FIG. 1.

FIG. 3 shows a control pulse sel supplied to the select portion 100e, a control pulse RES supplied to the reset portion 100d, a control pulse Tx supplied to the transfer portion 100b, a control pulse CTN supplied to the drive wire CTN, a control pulse CTS supplied to the drive wire CTS, and a control pulse T202 controlling the sampling switch 202 shown in FIG. 2. Prior to N signal sampling and S+N signal sampling for performing CDS processing, the sampling switch 202 is turned on, whereby the potential of the connection node 201*d* is held by the hold capacitor 203. During CDS processing, the sampling switch 202 is off, whereby the potential of the connection node 201*d* is held in the hold capacitor 203. Since the sampling switch 202 is not conductive during CDS processing, the noise of the voltage generator 201 is not transmitted. As a result, the noise of the voltage supply circuit 107 only includes the noises of the transistor 204 and the resistor 205.

The transistor 204, which is free from restrictions such as those for the transistor 604*a* of the known voltage generator, is so flexible that settings for reducing the noise can be easily made. During CDS processing, the potential of the voltage supply wire 108 is determined by the transistor 204. Therefore, if the transistor 204 is a MOS transistor, thermal noise can be largely reduced by setting the value of W/L, i.e., the conductance, of the transistor 204 to be large. Specifically, the conductance can be made higher than that of the transistor 201*a* of the voltage generator 201.

The transistor 204 may be configured as a buried-channel MOS transistor, which generates relatively low 1/f noise. Alternatively, the transistor 204 may be any low-noise transistor other than a MOS transistor. For example, if a junction field-effect transistor (JFET) or a bipolar transistor is employed, a control electrode of such a transistor is connected to the hold capacitor 203. In that case, when a current is supplied to the control electrode, the potential of the voltage supply wire 108 changes during CDS processing. Therefore, in the case of a bipolar transistor, for example, a Darlington transistor, which has a high current gain, can be chosen. Alternatively, the capacitance of the hold capacitor 203 may be increased.

In general, JFETs and bipolar transistors generate low 1/f noise and have high conductance compared to MOS transistors, and therefore can further reduce thermal noise and 1/f noise.

The potential of the connection node 201*d* can be set in such a manner that the potential of the voltage supply wire 108 becomes equal to the potential of the connection node 201*b*. Specifically, the resistances of the resistors 201*c* and 201*e* can be determined in such a manner that the potential difference between the gate and the source of the transistor 204 determined by configurational parameters of the transistor 204 and the current flowing therethrough becomes equal to the potential difference between the connection node 201*b* and the connection node 201*d*. The configurational parameters include the threshold voltage, the gate size, the channel mobility, and so forth, of the transistor 204. In a case where simple ohmic resistors are employed, if it is difficult to set the potential of the voltage supply wire 108 to be equal to the potential of the connection node 201*d* only by adjusting the resistances of the resistors 201*c* and 201*e*, the resistor 201*c* may be replaced with a transistor resistor, for example, having the same configuration as the transistor 204. In that case, the control electrode and one of main electrodes of the transistor for the resistor 201*c* are connected to the connection node 201*d*, and the other main electrode is connected to the connection node 201*b*. With such a configuration, the potential difference between the gate and the source of the transistor 204 can be easily set to be equal to the potential difference between the connection node 201*d* and the connection node 201*b*.

In the first embodiment, the circuit configuration of the voltage generator 201 is not limited to the one shown in FIG. 2, and may be of any other type.

Further, the voltage generator 201 is not limited to the one that supplies a voltage to the gates of the load MOS transistors 105 provided for the vertical output lines 102, and may be applied in more general cases to a voltage supply circuit that supplies a voltage to signal-processing circuits that process, in parallel, signals output from the pixels. Examples of such signal-processing circuits include columnar amplifier circuits and CDS circuits.

Although the configuration shown in FIG. 1 includes both load MOS transistors and columnar signal-processing circuits provided for the vertical signal lines, the first embodiment may also applied to a configuration including either load MOS transistors or columnar signal-processing circuits. Specifically, the first embodiment may be applied to a case where each pixel only includes a photoelectric converter and a transfer switch and each pixel column is provided with a columnar amplifier circuit (columnar signal-processing circuit), and a case where each pixel includes an amplifier and each vertical signal line is provided with a load MOS transistor but without a columnar signal-processing circuit.

To summarize, according to the first embodiment, because a voltage can be supplied via a voltage supply wire that is less influenced by noise during CDS processing, horizontal noise can be reduced.

Second Embodiment

Figure 4:
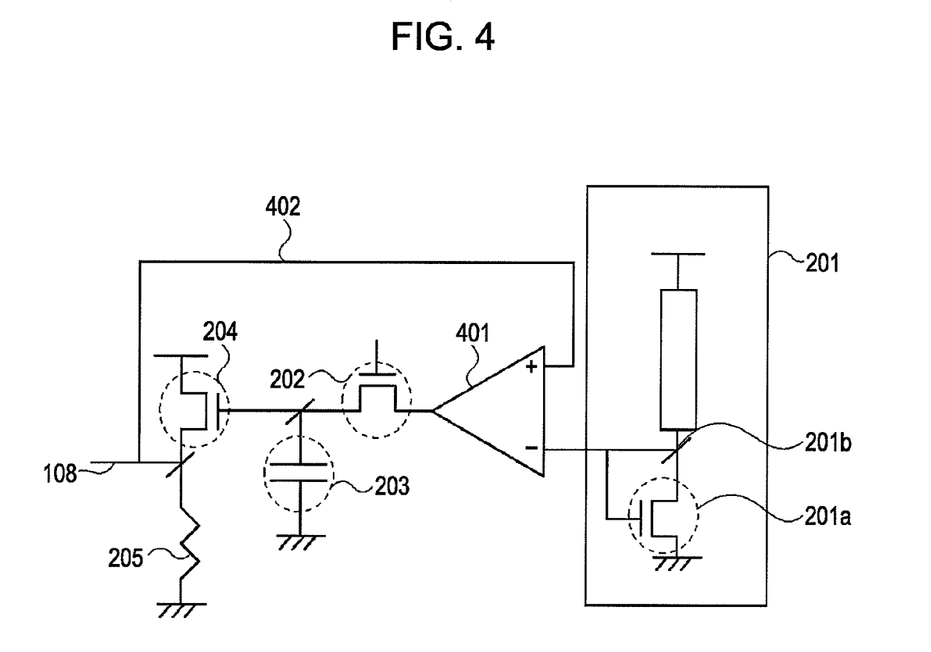
FIG. 4 is a diagram for describing a voltage supply circuit according to a second embodiment.

FIG. 4 is an equivalent circuit diagram of a voltage supply circuit according to a second embodiment. Elements similar to those of the first embodiment are denoted by the same reference numerals, and detailed descriptions thereof are omitted. In addition to the elements provided in the first embodiment, the voltage supply circuit of the second embodiment includes an operational amplifier circuit (a second amplifier circuit). Referring to FIG. 4, the voltage supply circuit includes an operational amplifier circuit 401 and a feedback path 402. A non-inverting input terminal of the operational amplifier circuit 401 and the voltage supply wire 108 (the output part of the voltage supply circuit) are connected to each other. The operational amplifier circuit 401 is provided between the voltage generator 201 and the sampling switch 202. The feedback path 402 connects an output node of the first amplifier circuit (the transistor 204 and the resistor 205) and an input node of the operational amplifier circuit 401.

As in the first embodiment, the predetermined voltage to be supplied is equal to the potential of the connection node 201*b* of the voltage generator 201. In addition, the potential of the output part of the voltage supply circuit is made to be equal to the potential of the connection node 201*b* with higher accuracy. Specifically, the non-inverting input terminal of the operational amplifier circuit 401 and the output part of the voltage supply circuit are connected to each other via the feedback path 402, and an inverting input terminal of the operational amplifier circuit 401 and the connection node 201*b* are connected to each other. Further, the output part of the operational amplifier circuit 401 is connected to the sampling switch 202. The output of the operational amplifier circuit 401 is first held by the hold capacitor 203 via the sampling switch 202, and is subsequently supplied to the control electrode of the transistor 204. The timing with which the sampling switch 202 operates is the same as in the first embodiment.

When the sampling switch 202 is on, a voltage is supplied to the control electrode of the transistor 204 in such a manner that the potential of the output part of the voltage supply circuit, i.e., the source of the transistor 204, and the potential of the connection node 201b become equal to each other. Because the sampling switch 202 is off during CDS processing, the influence of noises from the operational amplifier circuit 401 and the voltage generator 201 over the output part of the voltage supply circuit is reduced. The noise in this case is determined only by the transistor 204, as in the first embodiment. Further, as in the first embodiment, the transistor 204 may be a low-noise transistor. Moreover, the configuration of the voltage generator 201 may be modified. In addition, although the configuration shown in FIG. 4 includes the operational amplifier circuit 401, any other feedback circuit may be alternatively employed as long as the potential of the output part of the voltage supply circuit can be made to be equal to the potential of the connection node 201b with high accuracy.

According to the second embodiment, because a voltage can be supplied via a voltage supply wire that is less influenced by noise during CDS processing, horizontal noise can be reduced. In addition, because the voltage to be supplied via the voltage supply wire can be set more accurately, the solid-state image pickup device can be made to operate more accurately.

Third Embodiment

Figure 5:
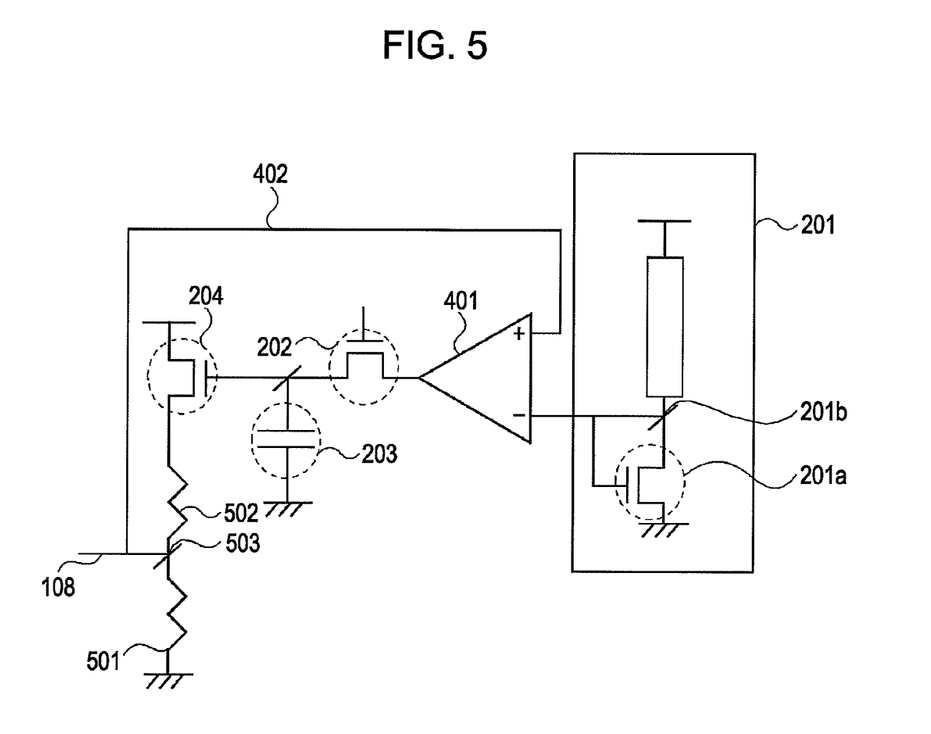
FIG. 5 is a diagram for describing a voltage supply circuit according to a third embodiment.

FIG. 5 is an equivalent circuit diagram of a voltage supply circuit according to a third embodiment. Elements similar to those in the first and second embodiments are denoted by the same reference numerals, and detailed descriptions thereof are omitted.

The third embodiment differs from the second embodiment in that the voltage supply circuit includes a first resistor 501 and a second resistor 502 connected in series on the output side of the transistor 204, with a connection node 503 between the resistors 501 and 502 being connected to the voltage supply wire 108. Operations of the switches and the like are the same as in the first and second embodiments. Also in the third embodiment, noises from the voltage generator 201 and the operational amplifier circuit 401 can be reduced by making the sampling switch 202 nonconductive during CDS processing. Further, in the third embodiment, the 1/f noise generated in the transistor 204 appears at the output part of the voltage supply circuit after being divided by the resistors 501 and 502. Therefore, if the 1/f noise of the transistor 204 is predominant over the thermal noise, the total noise can be reduced.

In a case of a complementary-metal-oxide-semiconductor (CMOS) sensor, which is the most typical example of an amplifier solid-state image pickup device, use of transistors other than those of an MOS type is impractical because the formation of such a sensor is complicated and therefore the manufacturing cost increases. Such a problem can be effectively solved by the third embodiment, because MOS transistors generate relatively high 1/f noise. In addition, as in the second embodiment, the voltage of the voltage supply wire can be set more accurately.

To summarize, according to the third embodiment, because a voltage can be supplied via a voltage supply wire that is less influenced by noise during CDS processing, horizontal noise can be reduced. In addition, because the voltage to be supplied via the voltage supply wire can be set more accurately, the solid-state image pickup device can be made to operate more accurately.

Furthermore, noise can be reduced even if a transistor generating relatively high 1/f noise is provided at the output part of the voltage supply circuit.

Although the present invention has been described with reference to exemplary embodiments, it is to be understood that the present invention is not limited to the disclosed exemplary embodiments and that any changes and combinations thereof are acceptable within the scope of the present invention. For example, although the embodiments only concern the case where pixels include amplifiers, the present invention can also be applied to a configuration in which charges generated in photoelectric converters are read out via transfer portions directly to signal lines and signals according to the charges of the photoelectric converters are output to vertical output lines. In such a case, columnar signal-processing circuits are provided for respective pixel columns. The present invention can be applied to a voltage supply circuit that supplies a voltage to the columnar signal-processing circuits. The present invention can also be applied to a configuration that does not include columnar signal-processing circuits. In that case, the present invention can be applied to a voltage supply circuit that supplies a voltage to load MOS transistors that supply load currents for causing amplifiers of pixels to operate as followers.

The present invention is particularly effective in a configuration in which CDS processing is performed, but is not limited thereto. The present invention may also be applied to a configuration in which a processing circuit continuously processes a plurality of signals in parallel.

According to aspects of the present invention, random noise generated for each pixel row, for example, can be reduced.

The descriptions provided above only concern exemplary embodiments of the present invention and do not limit the technical scope of the present invention in any way. The present invention can be embodied in various manners without departing from the technical idea and the principles thereof.

This application claims the benefit of Japanese Patent Application No. 2008-066053 filed Mar. 14, 2008, which is hereby incorporated by reference herein in its entirety.

What is claimed is:

1. A method for controlling a solid-state image pickup apparatus comprising a pixel array in which a plurality of pixels each including a photoelectric converter configured to convert light into a charge and an amplifier configured to amplify and output a signal generated in accordance with the charge generated by the photoelectric converter is arranged two-dimensionally, a plurality of vertical output lines to each of which the signal from the amplifier included in each of the plurality of pixels in a corresponding column is output, and a plurality of load metal-oxide-semiconductor transistors each provided corresponding to one of the plurality of vertical output lines and each configured to supply a constant current to the amplifier included in each of the plurality of pixels in a corresponding column, the method comprising, during a signal reading time including a time for outputting a noise signal of each of the plurality of pixels to the plurality of vertical output lines and a time for outputting a light signal of each of the plurality of pixels to the plurality of vertical output lines:
  causing the solid-state image pickup apparatus to sample a predetermined voltage at a sample and hold circuit; and
  causing the solid-state image pickup apparatus to supply a voltage to the plurality of load metal-oxide-semiconductor transistors while electrically separating the sample and hold circuit from the voltage supply source.

2. The method according to claim 1, wherein the voltage supply source supplies voltage to the load metal-oxide-semiconductor transistors and amplifier circuits provided for each of the vertical output lines.

3. The method according to claim 1, wherein the voltage is supplied from the sample and hold circuit.

4. A method for controlling a solid-state image pickup apparatus comprising a pixel array in which photoelectric converters configured to convert light into charge are arranged two-dimensionally, a plurality of vertical output lines to which signals generated in accordance with the charge of the photoelectric converters are output, and a plurality of columnar signal-processing circuits including a plurality of metal-oxide-semiconductor transistors and configured to process the signals from the plurality of vertical output lines, the method comprising, during a signal reading time including a time for outputting a noise signal of each of the plurality of pixels to the plurality of vertical output lines and a time for outputting a light signal of each of the plurality of pixels to the plurality of vertical output lines:
- causing the solid-state image pickup apparatus to sample a predetermined voltage at a sample and hold circuit; and
- causing the solid-state image pickup apparatus to supply a voltage to the plurality of metal-oxide-semiconductor transistors while electrically separating the sample and hold circuit from the voltage supply source.

5. The method according to claim 4, wherein the voltage supply source supplies voltage to the load metal-oxide-semiconductor transistors and amplifier circuits provided for each of the vertical output lines.

6. The method according to claim 4, wherein the voltage is supplied from the sample and hold circuit.

* * * * *